Jan. 20, 1959  A. D. HILL  2,869,696
SINGLE PEDAL THROTTLE AND BRAKE CONTROL FOR VEHICLES
Filed Aug. 2, 1954  2 Sheets-Sheet 1

INVENTOR.
ARLIE D. HILL
BY
Knox & Knox

Jan. 20, 1959   A. D. HILL   2,869,696
SINGLE PEDAL THROTTLE AND BRAKE CONTROL FOR VEHICLES
Filed Aug. 2, 1954   2 Sheets-Sheet 2
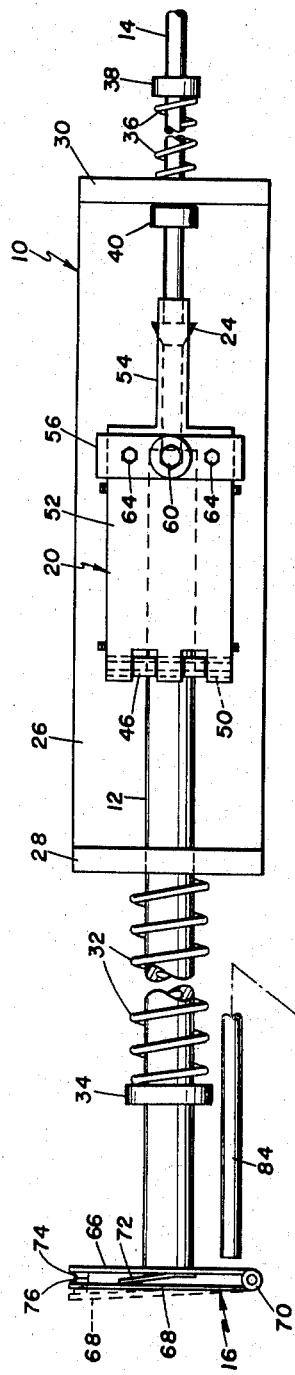
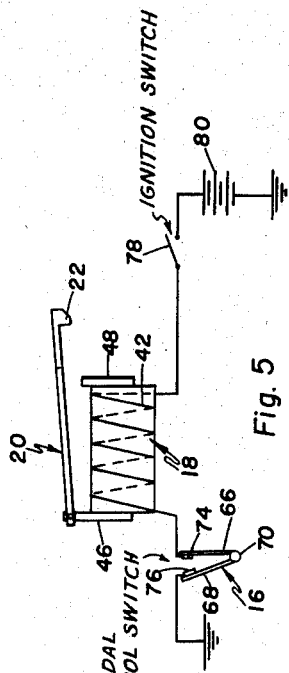
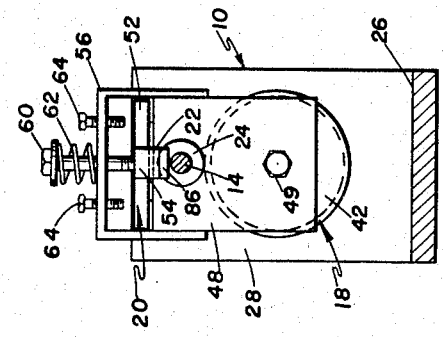
INVENTOR.
ARLIE D. HILL
BY
Knox & Knox

United States Patent Office 2,869,696
Patented Jan. 20, 1959

2,869,696

SINGLE PEDAL THROTTLE AND BRAKE CONTROL FOR VEHICLES

Arlie D. Hill, San Diego, Calif.

Application August 2, 1954, Serial No. 446,994

12 Claims. (Cl. 192—3)

The present invention relates generally to motor vehicles and more particularly to a single pedal throttle and brake control for vehicles.

The primary object of this invention is to provide a single pedal control which enables the operator of a vehicle to control the speed of a vehicle accurately and to stop the vehicle without moving his foot from the pedal, so eliminating the delay normally incurred in moving the foot from the throttle to the brake pedal.

Another object of this invention is to provide a single pedal control by which the engine is returned to idle speed when the brakes are applied but is ready for immediate acceleration when the brakes are released.

Another object of this invention is to provide a single pedal control having a switch incorporated in the pedal arranged so that the engine automatically returns to idle speed when the foot is removed from the pedal.

Another object of this invention is to provide a single pedal control which may be fitted to many existing types of vehicles with a minimum of modification.

Another object of this invention is to provide a single pedal control which is inexpensive and practicable to manufacture.

Finally, it is an object to provide a single pedal control of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 3 is a top plan view of the device as shown in Fig. 1 and including a master brake cylinder to illustrate the cooperation therewith.

Fig. 4 is a sectional view taken on the line 4—4 of Fig. 2.

Fig. 5 is a wiring diagram of the simple electrical system of the device.

Figure 1:
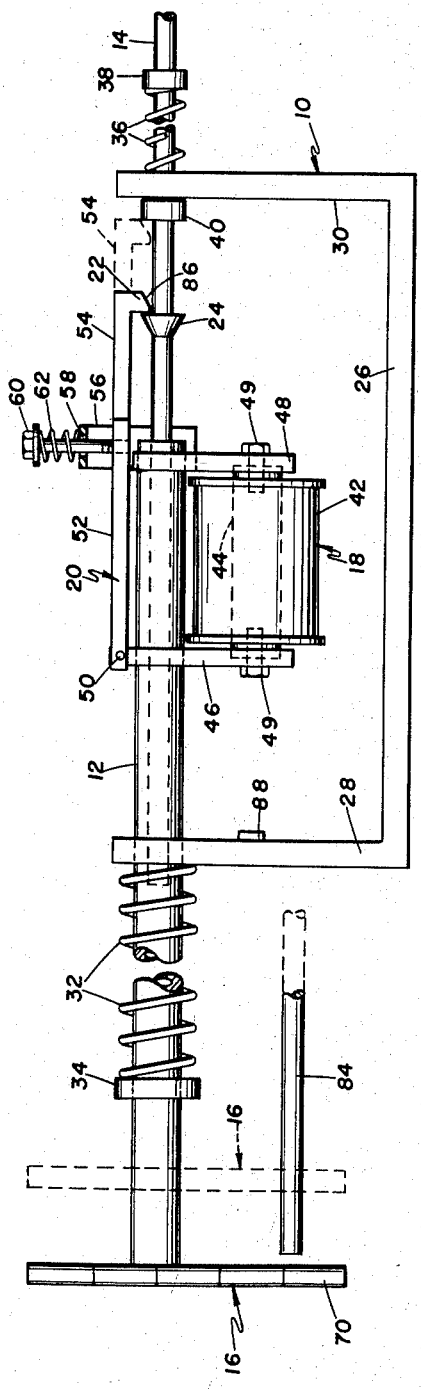
Fig. 1 is a side elevation view of the device showing the mechanism in "engine idle" position.

Referring now to the drawing in detail, the device comprises a frame 10 in which is mounted an axially slidable actuating tube 12, and a throttle control rod 14 axially slidable within the tube 12. Secured to the outer end of the tube 12 is a foot pedal 16, while fixedly mounted on the other end of said tube within the frame 10 is an electromagnet 18. Positioned adjacent the electromagnet 18 is a pivotally mounted latch member 20 having a tongue 22 which is shaped to engage a latching cone 24 fixed on the throttle rod 14.

The frame 10 is generally U-shaped and comprises a bed plate 26 and end plates 28 and 30. The tube 12 is slidable in the end plate 28 and is biased outwardly of the frame 10 by a return spring 32 fitted over said tube between said end plate and a retaining collar 34, which is fixed to the tube.

The throttle rod 14 slides in the end plate 30 and is biased outwardly by a return spring 36 fitted over said rod between said end plate and a retaining collar 38, which is fixed to the rod. The outward travel of the throttle rod 14 is limited by a stop 40 fixed thereto internally of the end plate 30 and spaced from the latching cone 24.

The electromagnet 18 comprises a coil 42 having therein a core 44 to which are attached pole pieces 46 and 48, secured by screws 49. The pole pieces 46 and 48 extend upwardly beyond the coil 42 and fit over the tube 12 which is secured fixedly thereto. The pole piece 46 extends beyond the tube 12 and supports the latch member 20, which is pivotally attached thereto by a hinge pin 50.

This latch member 20 comprises a plate 52 from which extends an arm 54, having at its end the downwardly projecting tongue 22, said arm being substantially parallel to the throttle rod 14. Fitted over and spaced above the latch member 20 is an inverted U-shaped saddle 56 secured at both sides to the pole piece 48. In the saddle 56 is a central opening 58 through which passes a lift pin 60 secured in the latch member 20, said lift pin being biased upwardly by a spring 62 to raise the latch member. On either side of the lift pin 60 are stop pins 64 which extend downwardly through the saddle 56 and limit the upward travel of the latch member 20.

The foot pedal 16 comprises a back plate 66 and a pressure plate 68 which are pivotally interconnected by a suitable hinge 70, said plates being urged apart by a separator spring 72. Secured to the back plate 66 and pressure plate 68, adjacent their free edges, are opposed switch contacts 74 and 76 respectively, said plates being of insulative material.

With reference to Fig. 5, it will be seen that the switch contacts 74 and 76 are electrically connected to the ground and to the coil 42 respectively, the ground connection being to the normal ground of the vehicle electrical circuit. The coil 42 is further connected, through the existing ignition switch 78, to the vehicle battery 80, so that the device is operative only when the vehicle ignition is turned on. It will be evident, however, from the following description, that the vehicle brakes may still be actuated whether or not the throttle actuating portion is operative.

The brakes are actuated through the usual master brake cylinder, indicated at 82 in Fig. 3, which is operatively connected to a suitable push rod 84, said push rod being positioned to be engaged by the foot pedal 16 as the pedal is depressed beyond a certain point in its travel.

To operate the device, the vehicle ignition is turned on and the engine started in the normal manner. The foot pedal 16 is then depressed causing the switch contacts 74 and 76 to meet, so energizing the coil 42. The latch member 20 is thus pulled downwardly by the magnetic field in the pole piece 48. As the foot pedal 16 is depressed further, the tube 12 is forced inwardly into the frame 10, carrying with it the electromagnet and latch assembly. The tongue 22 is provided with a cam portion 86 so that, as said tongue reaches the latching cone 24, this cam portion causes the latch member 20 to be lifted against the magnetic pull until the tongue drops into place behind said cone and is firmly held in place. The foot pedal 16 is then released gradually, although not sufficiently to allow the switch contacts 74 and 76 to open and, as the tube 12 is drawn outwardly by the return spring 32, the throttle rod 14 is pulled inwardly by the latch member 20, so opening the throttle which is operatively connected to said rod. In the full throttle position, as shown in full line in Fig. 2, the tube 12 is withdrawn until the pole piece 46 is adjacent the end plate 28, an end stop 88 being provided on said end plate to contact the screw 49.

Figure 2:
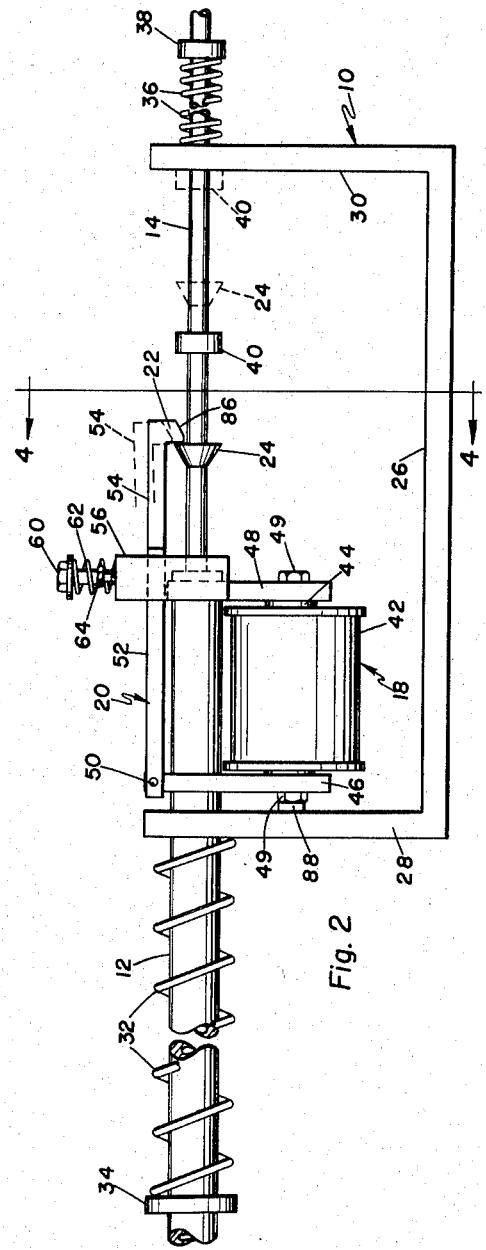
Fig. 2 is a side elevation view thereof showing the mechanism in "full throttle" position.

If the foot is now removed from the foot pedal 16, the electromagnet 18 is de-energized allowing the latch member 20 to be lifted, as indicated in dotted line in Fig. 2. This action releases the latching cone 24 so that the return spring 36 returns the throttle rod 14 to the engine idle position, as shown in dotted line.

To apply the brakes, the foot pedal 16 is merely depressed to the position shown dotted in Fig. 1, the latch member 20 overriding the latching cone 24, also as shown dotted. The foot pedal 16 thus depresses the push rod 84 and applies the brakes as required. It should be noted that the throttle rod 14 is at the engine idle position, with the stop 40 against the end plate 30, while the brakes are applied. As soon as the brakes are released, the throttle rod 14 is once more drawn inwardly to open the throttle as the foot pedal 16 is returned to the necessary driving position. Whenever the foot is removed from the foot pedal 16, either intentionally or inadvertently, the engine is immediately returned to idle position. This provides a welcome safety factor should the driver of a vehicle become ill or otherwise lose control of the vehicle.

The brakes may be applied at any time, whether the electromagnet 18 is operative or not, merely by depressing the foot pedal 16 as necessary, the braking action being controlled entirely by the foot pedal itself on the push rod and being independent of the throttle actuating mechanism. It will be evident that the arrangement of the controls is efficient in that the braking position of the device is adjacent the low speed or engine idle position. Thus the transition from slow speed to stop is continuous as the throttle is closed to slow down the vehicle. This, together with the fact that the foot remains on one pedal to accomplish both accelerating and stopping, greatly decreases the time lag incurred in an emergency stop. With normal driving controls the foot must be lifted from the throttle pedal and placed on the brake pedal when stopping. This action coupled with the normal delay of reaction of the driver can prove fatal when the vehicle is moving at high speed. With the present invention, the braking action is obtained by an instinctive forward thrust of the foot already in place on the pedal.

It should be noted that with the present device, the foot pedal 16 is released to increase speed rather than depressed as with normal controls. This condition, although opposite to the normal operation of the controls, is easily practiced and is no more difficult than the normal method, it being necessary to overcome a certain amount of spring pressure in either type of pedal. In fact this arrangement is less conducive to unintentional speeding than the usual throttle control, it being more natural for the foot to press increasingly downwardly while driving for a considerable distance. To ensure the return of the actuating tube 12 as the foot pedal 16 is released, the spring 32 is, of course, considerably stronger than the spring 36.

The present mechanism may be used successfully on vehicles having automatic transmissions or overdrive, in which a sudden application of full throttle shifts the drive into a lower gear for the purpose of passing other vehicles. The interconnection of such devices to the present mechanism will be obvious to those skilled in the art and need not be entered into in detail in this disclosure. Suffice it to say that the herein described invention is applicable to virtually all vehicles having a throttle control and a brake control.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawings are to be considered as merely illustrative rather than limiting.

I claim:

1. A single pedal throttle and brake control for vehicles, comprising a rigid frame, an elongated actuating tube axially slidably mounted in said frame and having a foot pedal fixed thereto, a rod for connection to a throttle, said rod being axially slidably mounted within said tube and said frame, a latching member pivotally mounted on said tube and extending longitudinally over said rod, a latching cone fixed on said rod, actuating means operatively connected to said foot pedal for urging said latch member into engagement with said latching cone whereby said tube and said rod are movable in unison in one direction, and brake actuating means operatively engageable by said foot pedal.

2. A single pedal throttle and brake control for vehicles, comprising a rigid frame, an elongated actuating tube axially slidably mounted in said frame and having a foot pedal fixed thereto, a rod for connection to a throttle, said rod being axially slidably mounted within said tube and said frame, said tube and said rod being biased outwardly of said frame in opposite directions and having fixed stops thereon to limit their outward travel, a latching member pivotally mounted on said tube and extending longitudinally over said rod, a latching cone fixed on said rod, actuating means operatively connected to said foot pedal for urging said latch member into engagement with said latching cone whereby said tube and said rod are movable in unison in one direction, and brake actuating means operatively engageable by said foot pedal.

3. A single pedal throttle and brake control for vehicles, comprising a rigid frame, an elongated actuating tube axially slidably mounted in said frame and having a foot pedal fixed thereto, a rod for connection to a throttle, said rod being axially slidably mounted within said tube and said frame, said tube and said rod being biased outwardly of said frame in opposite directions and having fixed stops thereon to limit their outward travel, a latching member pivotally mounted on said tube and extending longitudinally over said rod, a latching cone fixed on said rod, said latch member normally being biased away from said rod, an electromagnet secured to said tube to urge said latch member into engagement with said latching cone whereby said tube and said rod are movable in unison in one direction, a foot pressure actuated switch in said foot pedal connected to said electromagnet for energizing the same, and brake actuating means operatively engageable by said foot pedal.

4. A single pedal throttle and brake control for vehicles, comprising a rigid frame, an elongated actuating tube axially slidably mounted in said frame and having a foot pedal fixed thereto, a rod for connection to a throttle, said rod being axially slidably mounted within said tube and said frame, a pair of spaced magnetic pole pieces fixed to said tube, an electromagnet secured to and interconnecting said pole pieces, a foot pressure actuated switch in said foot pedal connected to said electromagnet to energize the same, a latch member pivotally attached to one of said pole pieces and extending longitudinally over the other pole pieces and said rod, a latching cone fixed to said rod, said latch member normally being biased away from said rod, and said electromagnet, when energized, urging said latch member into engagement with said latching cone whereby said tube and said rod are movable in unison in one direction, and brake actuating means operatively engageable by said foot pedal.

5. A single pedal throttle and brake control for vehicles, comprising a rigid frame, an elongated actuating tube axially slidably mounted in said frame and having a foot pedal fixed thereto, a rod for connection to a throttle, said rod being axially slidably mounted within said tube and said frame, a pair of spaced magnetic pole pieces fixed to said tube, an electromagnet secured to and interconnecting said pole pieces, a foot pressure actuated switch in said foot pedal connected to said electromagnet to energize the same, a latch member pivotally attached to one of said pole pieces and having an arm extending longitudinally over the other pole piece and said rod, a tongue depending from said arm, a latching cone fixed to said rod, said latch member normally being biased away from said rod, and said electromagnet, when energized, urging said arm toward said rod, said tongue having a cam portion to ride over said latching cone as the tube is slid inwardly over said rod, said tongue engaging said latching cone when said tube is withdrawn whereby the tube and said rod are movable as a unit in one direction, and brake actuating means operatively engageable by said foot pedal during continued inward movement of said tube beyond the point where said tongue overrides said latching cone.

6. A single pedal throttle and brake control for vehicles, comprising a rigid frame, an elongated actuating tube axially slidably mounted in said frame and having a foot pedal fixed thereto, a rod for connection to a throttle, said rod being axially slidably mounted within said tube and said frame, a pair of spaced magnetic pole pieces fixed to said tube, an electromagnet secured to and interconnecting said pole pieces, a foot pressure actuated switch in said foot pedal connected to said electromagnet to energize the same, a latch member pivotally attached to one of said pole pieces and extending longitudinally over the other pole piece and said rod, a latching cone fixed to said rod, a saddle secured to said last mentioned pole piece and extending over said latch member, a pin terminally secured in said latch member and extending through said saddle, a spring on said pin biasing said latch member away from said rod, stops projecting from said saddle to limit the travel of said latch member, and said electromagnet, when energized, urging said latch member into engagement with said latching cone whereby said tube and said rod are movable in unison in one direction, and brake actuating means operatively engageable by said foot pedal.

7. A single pedal throttle and brake control for vehicles, comprising a rigid frame, an elongated actuating tube axially slidably mounted in said frame and having a foot pedal fixed thereto, a rod for connection to a throttle, said rod being axially slidably mounted within said tube and said frame, a pair of spaced magnetic pole pieces fixed to said tube, an electromagnet secured to and interconnecting said pole pieces, a foot pressure actuated switch in said foot pedal connected to said electromagnet to energize the same, a latch member pivotally attached to one of said pole pieces and having an arm extending longitudinally over the other pole piece and said rod, a tongue depending from said arm, a latching cone fixed to said rod, a saddle secured to said last mentioned pole piece and extending over said latch member, a pin terminally secured in said latch member and extending through said saddle, a spring on said pin biasing said latch member away from said rod, stops projecting from said saddle to limit the travel of said latch member, and said electromagnet, when energized, urging said arm toward said rod, said tongue having a cam portion to ride over said latching cone as the tube is slid inwardly over said rod, said tongue engaging said latching cone when said tube is withdrawn whereby the tube and said rod are movable as a unit in one direction, and brake actuating means operatively engageable by said foot pedal during continued inward movement of said tube beyond the point where said tongue overrides said latching cone.

8. A single pedal throttle and brake control for vehicles, comprising a support, two elongated and inflexible elements mounted on said support for to and fro axial sliding movement in the same direction; one of said elements having a foot pedal operatively connected therewith; means to bias said one element to move axially in one direction from a depressed position toward a released position when foot pressure thereon is released; latching means for connecting said elements to move together when said one element moves from said depressed position toward said released position; and brake actuating means connected to move with said one element when said one element is moved in the opposite direction.

9. A control according to claim 12 wherein said elements are telescopically associated.

10. A single pedal throttle and brake control for vehicles, comprising: a rigid frame; a foot pedal; an element operatively connected with said foot pedal and biased to move in one direction from a depressed position toward a released position when foot pressure is released; an accelerator-operating element; latching means for interlocking said elements for simultaneous movement with said foot pedal in said one direction from the depressed position toward the released position connected to move with; and brake actuating means operatively connected to move with said foot pedal when the foot pedal is moved in the opposite direction.

11. A single pedal throttle and brake control for vehicles, comprising: a rigid frame; a foot pedal; an accelerator-operating element; latching means for interlocking said elements for simultaneous movement with said foot pedal in one direction; and brake actuating means operatively engageable by said foot pedal when the foot pedal is moved in the opposite direction; foot pressure-actuated means on said foot pedal to control the operation of said latching means, whereby said latching means is rendered inoperative when the foot is removed from the foot pedal, thus constituting a safety feature.

12. Apparatus according to claim 8 wherein said latching means is electromagnetically operated and includes a control switch closed by any significant foot pressure on said foot pedal.

References Cited in the file of this patent

UNITED STATES PATENTS

| | | |
|---|---|---|
| 2,083,940 | Burton | June 15, 1937 |
| 2,153,076 | Chase | Apr. 4, 1939 |
| 2,552,289 | Lillard | May 8, 1951 |